Feb. 17, 1931.  F. S. CARR  1,792,472
FASTENER
Filed Dec. 30, 1926
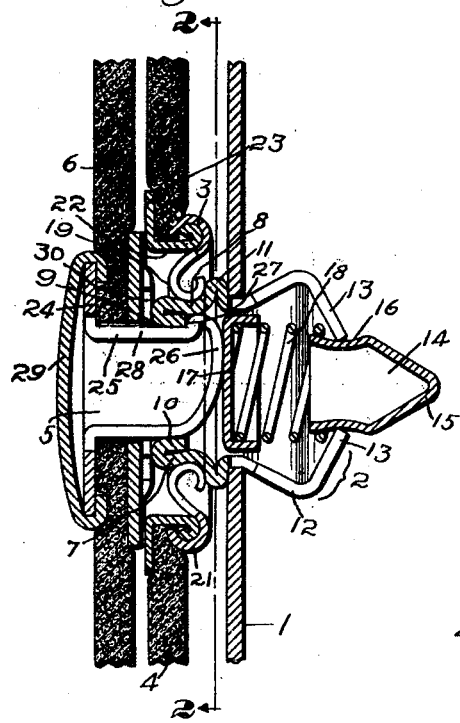
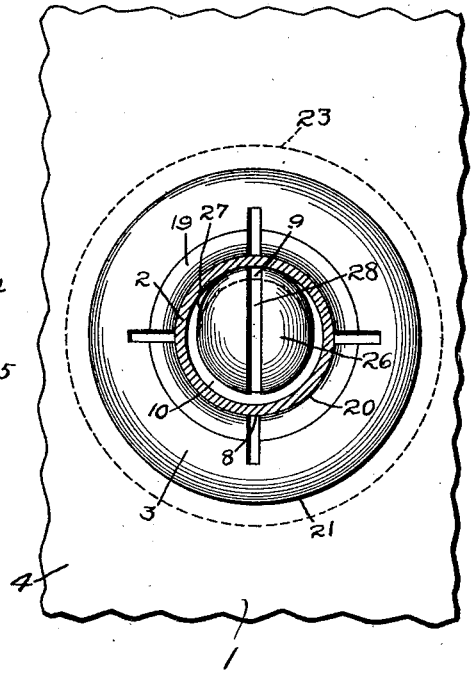
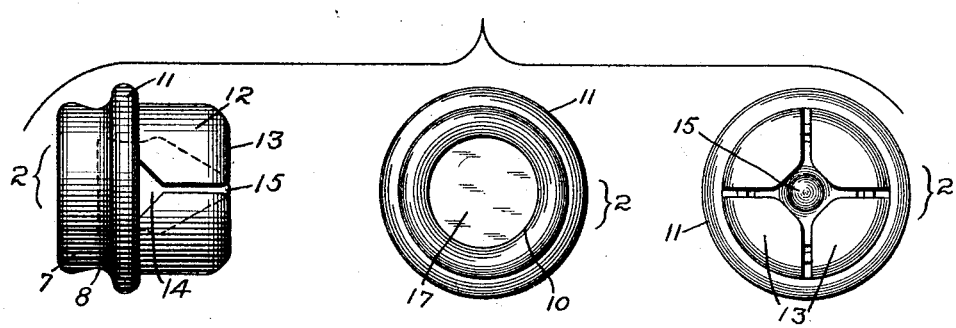
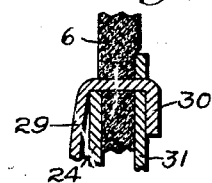
Inventor:
Fred S. Carr Patented Feb. 17, 1931

1,792,472

UNITED STATES PATENT OFFICE

FRED S. CARR, OF NEWTON, MASSACHUSETTS, ASSIGNOR, BY MESNE ASSIGNMENTS, TO UNITED-CARR FASTENER CORPORATION, OF CAMBRIDGE, MASSACHUSETTS, A CORPORATION OF MASSACHUSETTS

FASTENER

Application filed December 30, 1926. Serial No. 157,968.

My invention aims to provide improvements in plural fastenings of the stud and socket type.

In the drawings, which illustrate a preferred embodiment of my invention:—

Figure 1 is a vertical section showing the formation and use of three fastening elements according to my invention;

Fig. 2 is a section on the line 2—2 of Fig. 1, showing parts of the fastener installation in elevation;

Fig. 3 includes a side, a front and a rear elevation, respectively, of the combined stud and socket member; and Fig. 4 is a detail sectional view, showing the manner of attaching the stud to the outer curtain.

Referring to the specific embodiment of my invention illustrated in the drawings, I have shown a plural fastening installation including a rigid support 1, which may be the body of a vehicle, having a combined stud and socket member 2 secured thereto, a socket 3 secured to a curtain 4, and a stud 5 secured to a second curtain 6.

The combined stud and socket member 2 is pressed from a single piece of metal, and has a boss or projecting portion 7 (Figs. 1 and 3) which provides at its outer surface a stud portion having an annular groove, providing a neck 8. This portion 7 has a stud-receiving aperture 9 at its outer end surrounded by a wall 10, which cooperates with the stud 5, as shown in Fig. 1. A flange 11 is provided for limiting the entrance of the member 2 into the opening in the support 1. The inner end of the combined stud and socket unit is cup-shaped and provides attaching means which is slit to form a plurality of fingers 12, having inbent portions 13, terminating at an aperture, as shown in Fig. 3. Within the member 2, I have provided a locking element 14, pressed from sheet metal and having a tapered end 15 entered into the aperture between the inbent portions 13. This locking element is provided with a slight annular groove 16, into which the ends of the inbent portions contract when the fingers are upset to secure the member 2 to the support 1, as shown in Fig. 1.

The stud-receiving aperture 9 is normally closed by a closure plate 17, pressed forwardly, against the inner edge of the wall 10, by the spring 18.

When attaching the combined stud and socket member 2 to the support 1, I first insert the fingers 12 through the aperture in the support until the flange 11 seats against the outer face of the support. I then insert a suitable tool into the aperture 9 and press the closure plate 17 inwardly against the pressure of the spring 18. The closure plate in turn, presses the locking element between the ends of the inbent portions, thereby expanding them, as shown in Fig. 1. The closure plate 17 is cup-shaped in cross-section for the purpose of providing means for preventing pressing the locking element 14 entirely beyond the fingers 12. That is to say, the edge 19 of the closure plate contacts with the inbent portions of the fingers to prevent the locking element being pressed beyond the position shown in Fig. 1.

The socket 3, shown in Figs. 1 and 2, is pressed from a single piece of metal and is generally shaped in the form of a reverse curve in cross-section. The inner curved portion 19, surrounding the stud-receiving aperture 20, is made contractible and expansible for engagement with a stud, and the outer curved portion 21 provides means for assisting in securing the socket to the curtain 4. While this socket may be secured to the curtain 4 in any suitable manner, I have shown it secured thereto by means of a tubular rivet 22, having a flange 23, seated against the opposite side of the curtain from the socket. The rivet passes through a hole in the curtain and is upset and clinched by the outer portion 21 of the socket, as shown in Fig. 1.

The stud 5 is pressed from a single piece of metal and has a base 24, a relatively long shank 25, and a head 26 offset relative to the shank to provide a shoulder 27 between the head and shank, as shown in Figs. 1 and 2. This shoulder 27 is greater at one side and gradually diminishes at opposite sides of the stud. The stud 5 may be secured to the curtain 6 in any suitable manner, but I prefer to secure it thereto in the manner shown in Figs. 1 and 4. A vertical slit 28 divides the head and shank to provide resiliency to the stud. The base 24 of the stud lies at the front face of the curtain 6 and the shank passes therethrough so that the head 26 may engage the wall 10 of the member 2. The long shank affords greater resiliency to the head of the stud and, furthermore, reduces the possibilities that the stud may become set. An attaching plate 29 is secured to the base of the stud and has a plurality of prongs 30, which pass through the curtain 6 (Fig. 4) and through holes in a back plate 31 and are bent against the back plate to hold the stud 5 in position.

The type of fastening above described is particularly, though not exclusively, adapted for use in securing curtains to automobile bodies where two or more curtains overlap. Figs. 1 and 2 illustrate such a use of the fasteners, and when the socket 3 is secured to the boss portion 7 of the stud and socket member 2, it surrounds the boss and lies relatively close to the rigid support 1. It also exposes the outer end of the boss 7 so that the stud 5 may be readily engaged with and disengaged from the socket portion of the combined stud and socket, as shown in Fig. 2.

When the fasteners are secured together, the outer stud 5 holds the socket 3 in place upon the combined stud and socket 2, and the stud 5 is locked against separation from the combined stud and socket 2 except when the curtain is pulled at the lower side or at that side of the stud where there is no shoulder 27. It should be understood, however, that the stud 5 may be eliminated and the combined stud and socket 2 may serve merely as a stud to receive a socket, which latter may be of any suitable construction.

My invention is not restricted to the particular illustrative embodiment shown and described.

Claims:

1. A separable fastener stud for three-side lock fasteners having a base located at one side of a carrying medium, a shank portion extending from said base through the carrying medium and presenting at the other side of the carrying medium a head and a neck portion, a shoulder extending only part way around said shank between said head and said neck and a slit dividing said shank into two resilient portions having similar cross-sections and contours, said base being located at the opposite side of the carrying medium from the head and neck so as to provide a longer distance between the base and the head to provide greater resiliency to the head.

2. A plural fastener installation including a combination stud and socket unit secured to a support, the stud of said unit having an aperture in its outer end providing a stud-receiving aperture for the socket portion of said unit, a socket secured to a second support and adapted to engage the stud of said combination stud and socket and a stud secured to a third support and having a portion adapted to pass through the socket and second support and through the stud-receiving aperture of the combination stud and socket unit to engage the socket portion of said unit.

3. A plural fastener installation including a combination rigid stud and socket unit secured to a support, the stud of said unit having an aperture in its outer end providing a stud-receiving aperture for the socket portion of said unit, a resilient socket secured to a second support and adapted to engage said combination stud and socket, and a resilient stud secured to a third support and adapted to pass through the socket and second support and through the stud-receiving aperture of the combination stud and socket unit to engage the socket portion of said unit.

4. A combination fastener member having stud means at one end thereof for cooperative engagement with a socket, socket means adjacent to the stud means for cooperative engagement with a stud and a plurality of resilient portions located at the other end of said combination fastener member and adapted to be expanded to secure said member to a suitable support.

5. In a plural fastener installation, a combination stud and socket having a projecting portion provided with a neck to receive a cooperating socket, said projecting portion being hollow and having a stud-receiving aperture in one end surrounded by a wall for cooperative engagement with a stud, a cup-shaped laterally expansible attaching portion provided as a part of the combination stud and socket for securing it to a support and axially movable means normally located within the cup-shaped attaching portion prior to attachment to a support and adapted to be moved in a direction away from the projecting portion to expand said attaching portion and secure the combination stud and socket to the support.

6. A separable fastener socket including a one-piece casing part generally S-shaped in cross-section and having stud-receiving means surrounding a stud-receiving aperture, prong turning and clenching means provided at the outer periphery of said casing part and an attaching plate having a plurality of prongs for engagement with said prong turning and clenching means thereby to secure the casing part to a support.

7. A plural fastener comprising, in combination, a combined stud and socket unit 2 secured to a rigid support, the stud of said unit having a stud-receiving aperture in its outer end to provide the socket means of said unit, a socket member 3 secured to a support 4 and engaged with the stud portion of the combined unit and a yieldable stud member 5 secured to a support 6 and engaged in the stud-receiving aperture of the socket portion of the combined unit.

8. A stud installation comprising, in combination, a support having an aperture therethrough, a stud member attached to the support and having a flange seated against the outer face of the support, a stud head and neck portion extending from the said flange, and expansible attaching means extending from said flange in the opposite direction from said head and neck portion and passing into the aperture in the support and means forming part of the stud assembly prior to attachment to the support and cooperating to expand said attaching means and secure the stud to the support.

9. A stud member having socket-receiving means in the form of a head and a neck located at one end thereof, a cup-shaped laterally expansible attaching portion at the other end thereof, an annular shoulder located between the socket-receiving means and the attaching portion and means located within the cup-shaped attaching portion prior to attachment to a support and adapted to be moved axially away from the shoulder to expand the attaching portion and secure the stud member to a support.

10. A stud member having an annular shoulder located between its ends, means comprising a stud head and a neck located at one side of said shoulder for accommodating a socket, an attaching portion located at the other side of said shoulder and forming part of the stud assembly, said attaching portion being divided into a number of expansible portions adapted to be entered into an aperture in a support and to be expanded therein to secure the stud member to the support and means forming part of the stud assembly prior to attachment to a support whereby when moved axially relative to the attaching portion said expansible portions are expanded to secure the stud member to a support.

11. A stud member having a flange, a stud head and neck portion extending from said flange, means providing an opening in the stud head, expansible attaching means extending in the opposite direction from said flange, expanding means located within the attaching means and a spring-pressed closure plate assembled with the stud member for closing the opening of the stud while permitting the insertion of a tool in said opening to force said closure plate against the expanding means and expand said attaching means.

12. A stud member having a flange, a stud head and neck portion extending from said flange, means providing an opening in the stud head, expansible attaching means extending in the opposite direction from said flange, expanding means forming part of the fastener element for expanding said expansible attaching means when moved axially relative to the stud and a spring-pressed closure plate assembled with the stud member for closing an opening of the stud while permitting the insertion of a tool in said opening to move said expanding means and expand said attaching means.

13. A stud member having a flange, a stud head and neck portion extending from said flange, means providing an opening in the stud head, expansible attaching means extending in the opposite direction from said flange, a separate axially movable expanding member forming part of the fastener element for expanding said expansible attaching means when moved axially relative to the stud and a spring-pressed closure plate assembled with the stud member for closing an opening of the stud while permitting the insertion of a tool in said opening to move said expanding means and expand said attaching means.

In testimony whereof, I have signed my name to this specification.

FRED S. CARR.